US008140957B2

(12) United States Patent  
Horiuchi et al.

(10) Patent No.: US 8,140,957 B2
(45) Date of Patent: Mar. 20, 2012

(54) TECHNIQUE FOR CONTROLLING SCREEN DISPLAY

(75) Inventors: Yoshio Horiuchi, Hiratsuka (JP); Masaki Saitoh, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/023,762

(22) Filed: Jan. 31, 2008

(65) Prior Publication Data

US 2010/0218138 A1   Aug. 26, 2010

(30) Foreign Application Priority Data

Jan. 31, 2007   (JP) .................................. 2007-020744

(51) Int. Cl.
   *G06F 17/27* (2006.01)
(52) U.S. Cl. ........................ 715/210; 715/203; 715/200
(58) Field of Classification Search .................. 715/243, 715/815, 777, 830, 764, 730, 715, 710, 202, 715/210, 236, 717, 719, 751, 854, 861, 203, 715/200; 707/100; 709/234; 345/522, 1.1, 345/102, 11, 173, 3.2, 33, 551, 554, 581, 345/601, 689, 87, 569
   See application file for complete search history.

(56) References Cited

U.S. PATENT DOCUMENTS

| | | | | |
|---|---|---|---|---|
| 5,845,084 A * | 12/1998 | Cordell et al. | ................. | 709/234 |
| 7,386,801 B1 * | 6/2008 | Horvitz et al. | ................. | 715/764 |
| 7,409,635 B2 * | 8/2008 | Epstein | .......................... | 715/243 |
| 7,511,712 B1 * | 3/2009 | Johns et al. | .................... | 345/522 |
| 7,665,038 B1 * | 2/2010 | Chaudhri et al. | ............. | 715/830 |
| 7,665,039 B2 * | 2/2010 | Chaudhri et al. | ............. | 715/830 |
| 7,703,036 B2 * | 4/2010 | Satterfield et al. | ............ | 715/777 |
| 7,779,367 B2 * | 8/2010 | Oshiro et al. | ................. | 715/815 |
| 7,797,643 B1 * | 9/2010 | Jobs et al. | ...................... | 715/815 |
| 2007/0234233 A1 * | 10/2007 | Chang et al. | ................... | 715/815 |
| 2008/0294651 A1 * | 11/2008 | Masuyama et al. | ........... | 707/100 |
| 2009/0049406 A1 * | 2/2009 | Epstein | .......................... | 715/810 |

* cited by examiner

*Primary Examiner* — Doon Chow
*Assistant Examiner* — David Choi
(74) *Attorney, Agent, or Firm* — Steven M. Greenberg, Esq.; Carey, Rodriguez, Greenberg & O'Keefe

(57) ABSTRACT

The present invention aims at automatically selecting an object which should be displayed in a simplified form in a manner such that user friendliness is not reduced and the drawing time is shortened. To this end, the invention provides a system for controlling a screen display, which includes a structure acquisition unit configured to acquire tree structure data, as structure data defining a structure of a document to be displayed on a screen, in which a plurality of display objects are represented as nodes and a display object indicating a more detailed configuration of a display object at a parent node is represented as a child node, a time acquisition unit configured to acquire required time data which indicates time that has been previously required to draw each of the display objects on the screen, a selection unit configured to select, among the display objects at leaf nodes of the structure data, a display object having an evaluation value obtained based on the required time data which indicates that the required time is longer, preferentially to a display object having an evaluation value which indicates that the required time is shorter, and a drawing control unit configured to draw a display object other than the selected display object preferentially to the selected display object on the screen.

15 Claims, 8 Drawing Sheets

TECHNIQUE FOR CONTROLLING SCREEN DISPLAY

FIELD OF THE INVENTION

The present invention relates to a technique for controlling a screen display. Particularly, the present invention relates to the technique for drawing a display object based on information indicating layout of a screen.

BACKGROUND ART

A web authoring tool is a tool which allows a user to intuitively create and modify a web page on a GUI screen. With this tool, the web page displayed on an edit screen is substantially the same as the web page outputted as an editing result. Such a feature is called WYSIWYG (What You See Is What You Get), and is a condition for enabling efficient editing. In order to realize this, the web authoring tool requires displaying a web page in a similar manner to that of an actual web browser, based on data indicating layout of the web page.

Data indicating layout of a web page is described using a structured language, such as XML (eXtensible Markup Language). For this reason, displaying the web page requires processing for analyzing contents of such XML data, and the processing takes a certain amount of time. The processing time increases as a structure of the web page becomes more complicated. The processing time directly turns out to be waiting time for a user in a web authoring tool that utilizes a screen display for editing, which may cause decrease in editing efficiency. Although omitting a part of the screen display for reducing the processing time may be considered, important information for editing may not be displayed depending on an omitted part, which may decrease the editing efficiency by contrast.

As a reference technique, Japanese Patent Application Publication No. 2003-345788 proposes a technique for allowing full display and simplified display of an image in an electronic document to be switchable based on external operation by the user or the like. However, this technique only allows switching of the display, and it cannot automatically determine as to which display object should be displayed in a simplified form or hidden for reducing the processing time.

SUMMARY OF THE INVENTION

Accordingly, the present invention is directed to provide a system, a method, and a program which can solve the above-described problems. This object is achieved by the combinations of the features described in the independent claims. The dependent claims define further advantageous examples of the present invention.

In order to solve the above-described problems, one aspect of the present invention provides a system for controlling a screen display, including: a structure acquisition unit configured to acquire tree structure data, as structure data defining a structure of a document to be displayed on a screen, in which a plurality of display objects are represented as nodes and a display object indicating a more detailed configuration of a display object at a parent node as a child node; a time acquisition unit configured to acquire required time data which indicates time that has been previously required to draw each of the plurality of display objects on the screen; a selection unit configured to select, among the display objects at leaf nodes of the structure data, a display object having an evaluation value obtained based on the required time data which indicates that the required time is longer, preferentially to a display object having an evaluation value which indicates that the required time is shorter; and a drawing control unit configured to draw a display object other than the selected display object preferentially to the selected display object on the screen. There is also provided a method of controlling a screen display by means of the system and a program for causing an information processor to function as the system. Note herein that the brief description above of the present invention does not recite all the essential features of the present invention, but sub-combinations of these feature groups can also constitute the present invention.

BEST MODE FOR CARRYING OUT THE INVENTION

The present invention will be hereinafter described through embodiments of the invention, but the following embodiments do not limit the invention claimed in the attached claims, and all combinations of features described in the embodiments are not always essential to the solving means of the invention.

Figure 1:
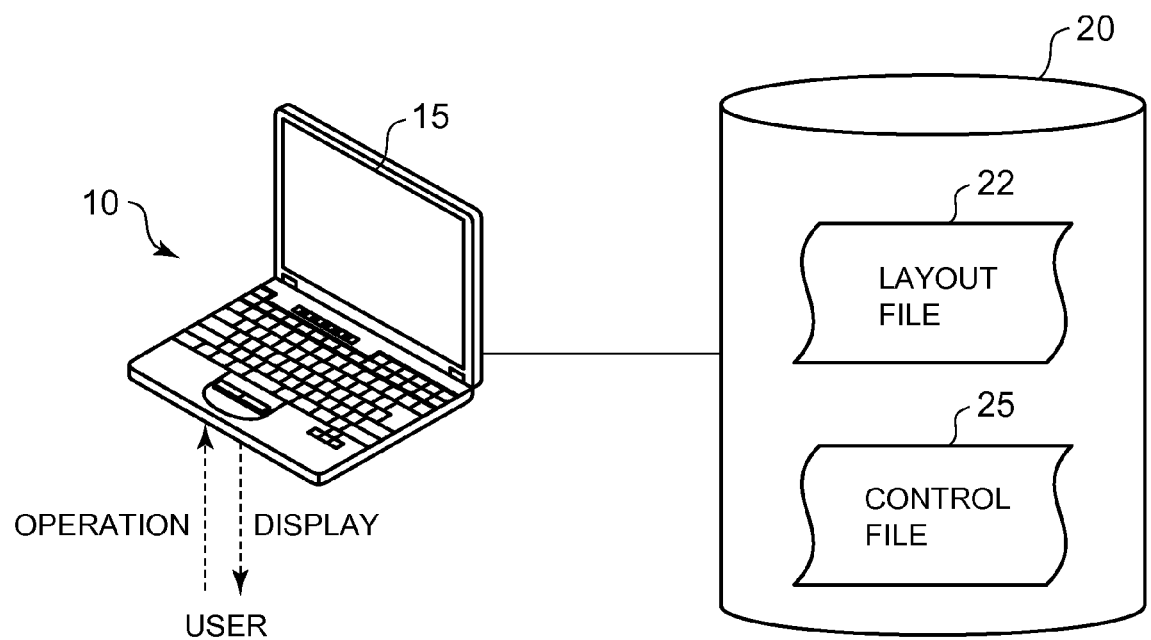
FIG. 1 schematically shows a configuration of an information system 10 and periphery thereof.

FIG. 1 schematically shows a configuration of an information system 10 and periphery thereof. The information system 10 includes software, referred to as a web authoring tool, for editing a web page installed therein, and this software and the information system 10 cooperate to configure an editing system. The information system 10 is connected to a database device 20 via a communication line. The information system 10 reads structure data indicating configuration, such as screen arrangement, of a plurality of display objects in the web page from a layout file 22 in the database device 20. The layout file 22 is an entity of data used as an editing target. The information system 10 also reads information, such as time which has been required for drawing processing when these display objects have been previously displayed, from a control file 25 in the database device 20.

The information system 10 displays the web page, based on the read structure data, in such a manner as if a web browser displays the web page on the screen. In this regard, there is a case in which the time required for displaying the web page may become longer if the number of the display objects is large or the configuration of the web page is complicated. Thus, the information system 10 selects a part of the display objects in the web page as display objects which should be displayed in a simplified form, based on the read information, such as the time for drawing processing and the like. The display objects are selected among those having less influence on the overall configuration of the web page and longer required time for drawing.

Instead of the selected display objects, the information system 10 displays symbols colored with foreground color, background color, or the like, which have been used when these objects have been previously drawn. When operation by a user for the displayed display object is received, the information system 10 updates the structure data corresponding to the display object and includes the data in the new layout file 22 to store same in the database device 20. As is understood, the information system 10 according to this embodiment is directed to reduce the time required for display by displaying a part of the display objects in the simplified form while minimizing the influence on appearance as much as possible upon displaying the web page on initiating or continuing the editing of the web page.

Figure 2A:
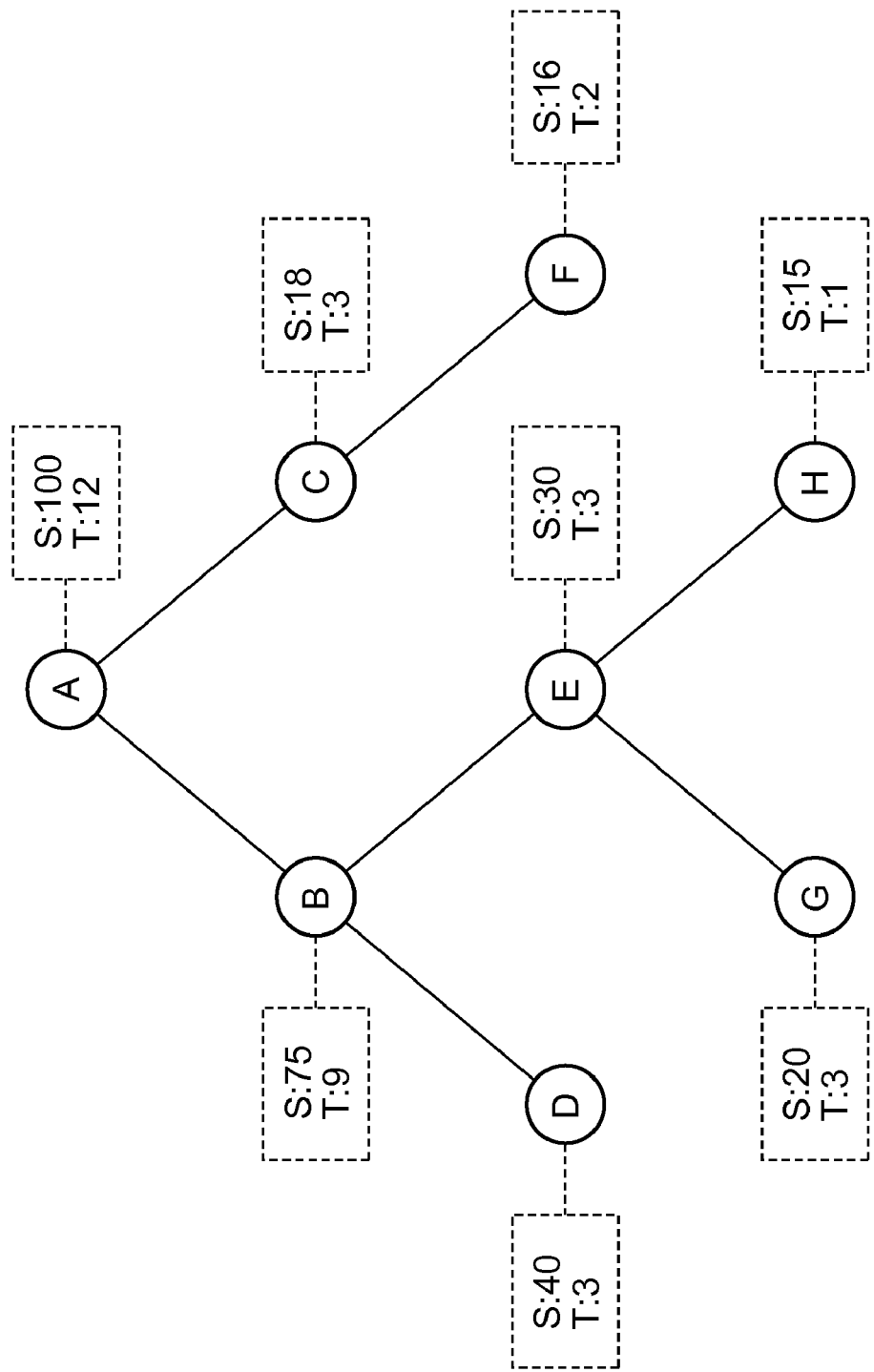
FIG. 2A schematically shows contents indicated by a layout file 22 and a control file 25.
Figure 2B:
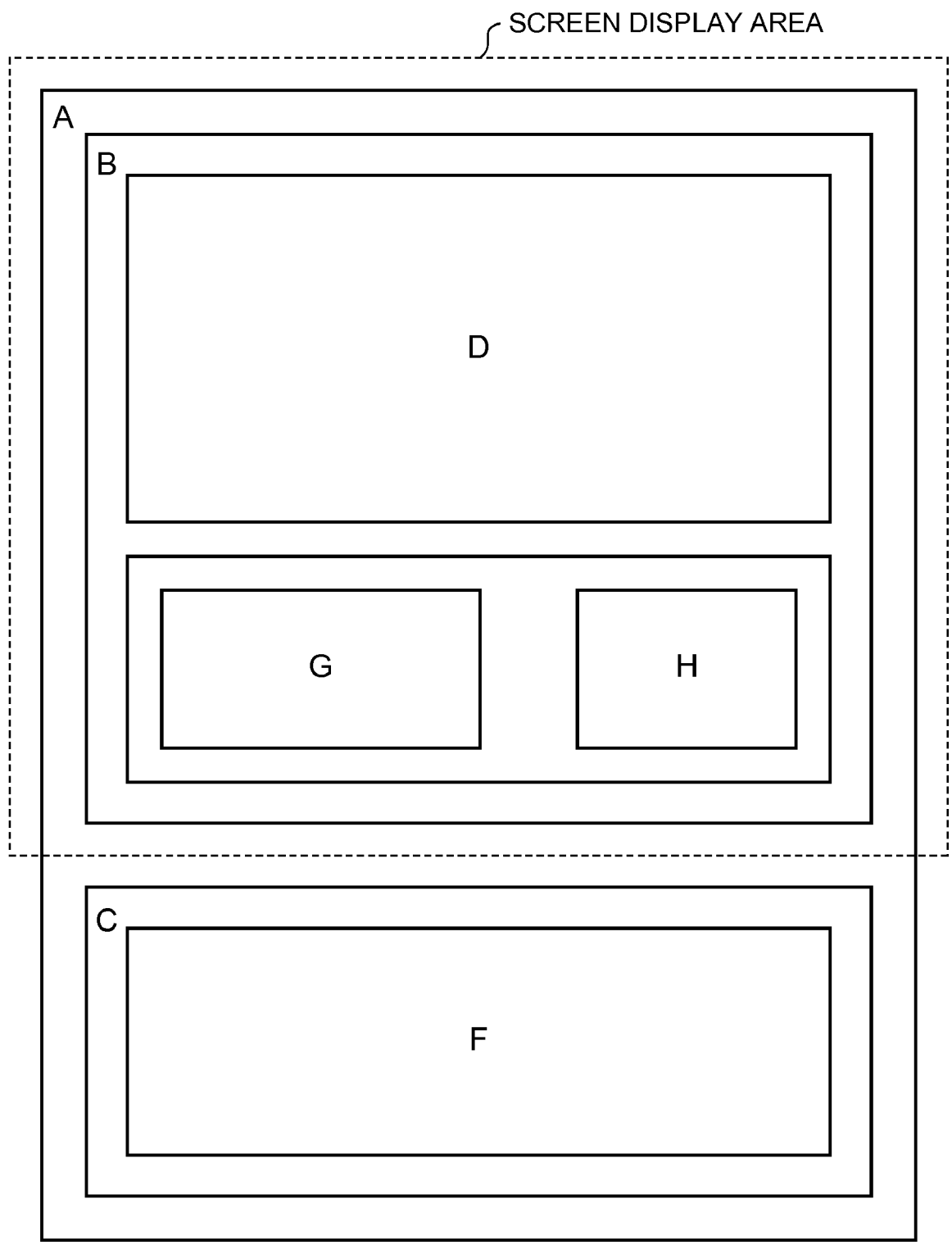
FIG. 2B shows an example of screen display based on the layout file 22 and the control file 25.

FIG. 2A schematically shows contents indicated by the layout file 22 and the control file 25. FIG. 2B shows an example of the screen display based on the layout file 22 and the control file 25. The layout file 22 records tree structure data, as structure data defining a structure of a document to be displayed on the screen, in which a plurality of display objects are represented as nodes and a display object indicating a more detailed configuration of a display object at a parent node is represented as a child node. In the example of FIG. 2A, nodes are denoted by symbols A-H. Straight lines connecting the nodes denoted by the symbols A-H are edges for connecting a parent node to a child node.

As shown in FIG. 2A, child nodes of a node A which is a parent node are nodes B and C, and child nodes when the node B is considered as a parent node are nodes D and E. For this reason, the nodes B and C indicate the more detailed configuration of the display object indicated by the node A. For example, as shown in FIG. 2B, the display objects indicated by the nodes B and C are displayed so that they are included in the display object indicated by the node A, and may be displayed so that they are superposed on a part of the display area thereof. As is understood, the relationship where one display object indicates the more detailed configuration of the other display object may be that where one display object is displayed so that it is included in the other display object.

Alternatively, the relationship where one display object indicates the more detailed configuration of the other display object may be that where the one display object indicates attributes of the other display object. For example, when the other display object indicates characters, the one display object may indicate color or font of the characters. As described above, while there are various types of the relationships where the one display object indicates the more detailed configuration of the other display object, one example may be the relationship, if the structure data is a tagged document, such as an XML document or the like, where a deeper display object in a nested hierarchy is a child node of a shallower display object. Furthermore, the layout file 22 may be the XML document or DOM (Document Object Model) data indicating the structure thereof.

The "document", the structure of which is defined by the structure data, is not necessarily one that includes text data, but it may be one which includes only image data. Namely, the "document" herein means simply a group of display objects stored in a storage device as a single file, and it does not limit the contents or a data format thereof.

Moreover, the control file 25 records required time data and area data which are shown in FIG. 2A by the dotted lines. The required time data indicate the time that has been previously required to draw each of the plurality of display objects on the screen, and it is shown in FIG. 2A by the symbol T. Additionally, the area data indicate the area of each of the plurality of display objects when it has been drawn on the screen, and it is shown in FIG. 2A by the symbol S. Specifically, the area of the display object A is 100 and the required time for drawing thereof is 12. Since the display object B is included therein, the area is 75, which is smaller than 100, and the required time is 9. Similarly, the area of the display object E is 30 and the required time for drawing it is 3. Although the display object G is included in this display object E, the required time thereof is 3, which is the same as that of the display object E.

These required time data and the area data are used to estimate the influence on the whole web page when displayed in the simplified form and the drawing time saved by the simplified display. In addition, in order to maintain appearance of the web page even when displayed in the simplified form, the control file 25 may further record information on the display position, shape, or color when each display object has been previously displayed. Specifically, the control file 25 may record, for each of the plurality of display objects, arrangement data indicating the position and shape on the screen when that display object has been previously drawn and color data indicating the background and foreground colors of that display object. With the information system 10 referring to these pieces of data, the appearance of the display object displayed in the simplified form can be assimilated to the actual display object.

Figure 3:
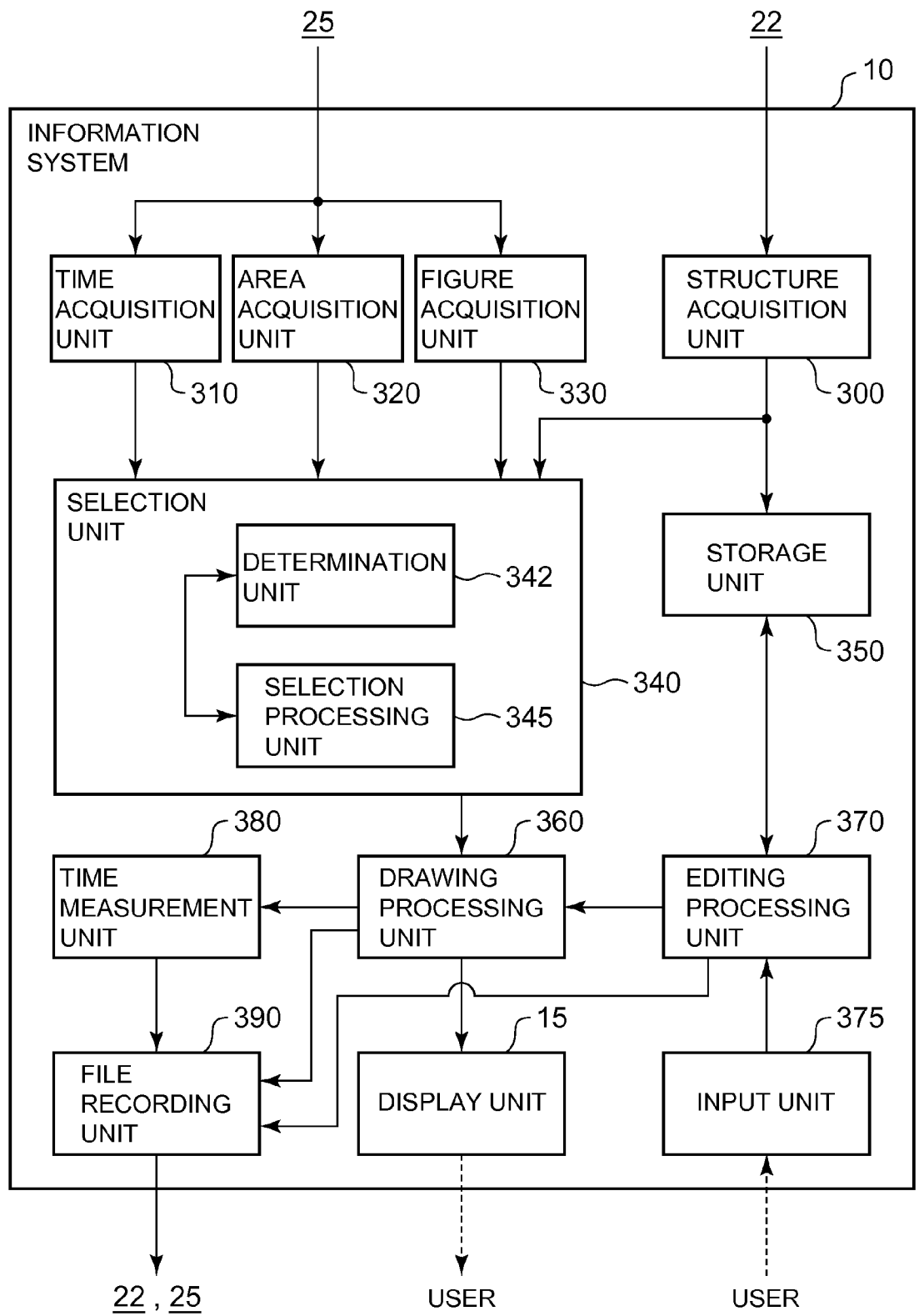
FIG. 3 shows an example of a functional configuration of the information system 10.

FIG. 3 shows an example of a functional configuration of the information system 10. The information system 10 is provided with a structure acquisition unit 300, a time acquisition unit 310, an area acquisition unit 320, a figure acquisition unit 330, a selection unit 340, a storage unit 350, a drawing processing unit 360, an editing processing unit 370, an input unit 375, a time measurement unit 380, a file recording unit 390, and a display unit 15. The structure acquisition unit 300 acquires the above described tree structure data from the layout file 22 as the structure data defining the structure of the document to be displayed on the screen. The time acquisition unit 310 acquires the required time data which indicates the time which has been previously required for drawing each of the plurality of display objects from the control file 25. The area acquisition unit 320 acquires the area data which indicates the area of each display object when each of the display objects has been drawn on the screen from the control file 25. The figure acquisition unit 330 acquires the arrangement data which indicates the position and shape of each display object and the color data indicating the color of each display object from the control file 25. All of these pieces of data have been created based on each display object drawn when the drawing processing unit 360, described later, has previously displayed the same web page.

The selection unit 340 selects, among the display objects at leaf nodes of the structure data, a display object which should be displayed in the simplified form, based on the required time data and the area data. Specifically, the selection unit 340 calculates an evaluation value of each display object based on the required time data and the area data. The selection unit 340 then selects a display object having the evaluation value which indicates that the required time is longer, preferentially to a display object having the evaluation value which indicates that the required time is shorter. In addition, the selection unit 340 selects a display object having the evaluation value which indicates that the area is smaller, preferentially to a display object having the evaluation value which indicates that the area is larger. More specifically, the selection unit 340 may generate an evaluation function which takes the large value depending on the amount of the required time and takes the small value depending on the size of the area, and input the required time and the area corresponding to each display object represented as the leaf node for the evaluation function. In this case, the selection unit 340 preferentially selects a display object having the larger evaluation value calculated like this.

However, there is a case in which the required time may not become sufficiently small even when all the leaf nodes are selected. In addition, the node which is not the leaf node may have the longer required time for drawing and be appropriate for the simplified display as compared to the leaf node. In order to address such a case, it is desirable that the selection unit 340 has a determination unit 342 and a selection processing unit 345, which alternatively repeat processing. The determination unit 342 calculates the total required time for drawing the display objects included in the structure data. In calculation of this total, any display object which has already been selected for the simplified display is excluded from the display objects as targets of calculation. The determination unit 342 then determines whether or not the calculated total time is equal to or less than a predetermined upper limit.

The selection processing unit 345 selects the display object having the longest required time from the leaf nodes in the tree structure excluding the display object which has already been selected from the structure data, under the condition that the total exceeds the upper limit. Since the tree structure as the target of selection excludes the display object which has already been selected, as described above, the node which has not been the leaf node before initiation of the selection processing can be selected. In response, the determination unit 342 further determines whether or not the total of the required time for drawing is not more than the upper limit for the structure data excluding the display object selected by the selection processing unit 345. The selection unit 340, if the total is not more than the upper limit, completes the selection processing of the display object. As is understood, the selection unit 340 sequentially selects the display objects from the nodes in the order of position, closest to a leaf side first, until the total required time for drawing becomes equal to or less than the upper limit.

The drawing processing unit 360 analyzes the contents of the structure data, and sets the position to display the display object, as well as the size and color thereof, to display it on the screen of the display unit 15. At this time, the drawing processing unit 360 draws other display objects preferentially to the display object selected by the selection unit 340 on the screen of the display unit 15. For example, the drawing processing unit 360 may display the display object selected by the selection unit 340 in the simplified form while displaying the other display objects in a full form. The simplified display means displaying a display object while omitting a part of pixels which should be displayed as the display object, and the full display means displaying a display object without omitting its pixels which should be displayed as the display object. As an example, the drawing processing unit 360 displays, instead of each display object selected by the selection unit 340, a figure having a shape based on the arrangement data of that display object at the position based on the arrangement data. The drawing processing unit 360 colors a borderline of the figure with the foreground color based on the color data and inside of the figure with the background color based on the color data. Thereby, even in the case of displaying in the simplified form, the appearance of the whole page can be assimilated to the full display.

The storage unit 350 stores the structure data acquired by the structure acquisition unit 300, and modifies the contents thereof in accordance with an instruction received from the editing processing unit 370, which will be described later. The editing processing unit 370 modifies the structure data stored in the storage unit 350 based on operation received by the input unit 375 for the display object drawn by the drawing processing unit 360. The time measurement unit 380 measures the required time for drawing the display object on the screen and outputs it to the file recording unit 390 for each of the display objects drawn by the drawing processing unit 360.

The file recording unit 390 reads the structure data stored in the storage unit 350 via the editing processing unit 370 and records it in the layout file 22, in accordance with the instruction to record the structure data in the file. In addition, the file recording unit 390 records, in response thereto, the information on the required time received from the time measurement unit 380 in the control file 25 as the required time data indicating the required time for displaying the same display object as each display object for the next time. In addition, the file recording unit 390 records the information indicating the area of each display object displayed on the screen, the information indicating the position or shape of each display object displayed on the screen, and the information indicating the color of each display object, in the control file 25, as the area data, the arrangement data, and the color data, respectively.

Figure 4:
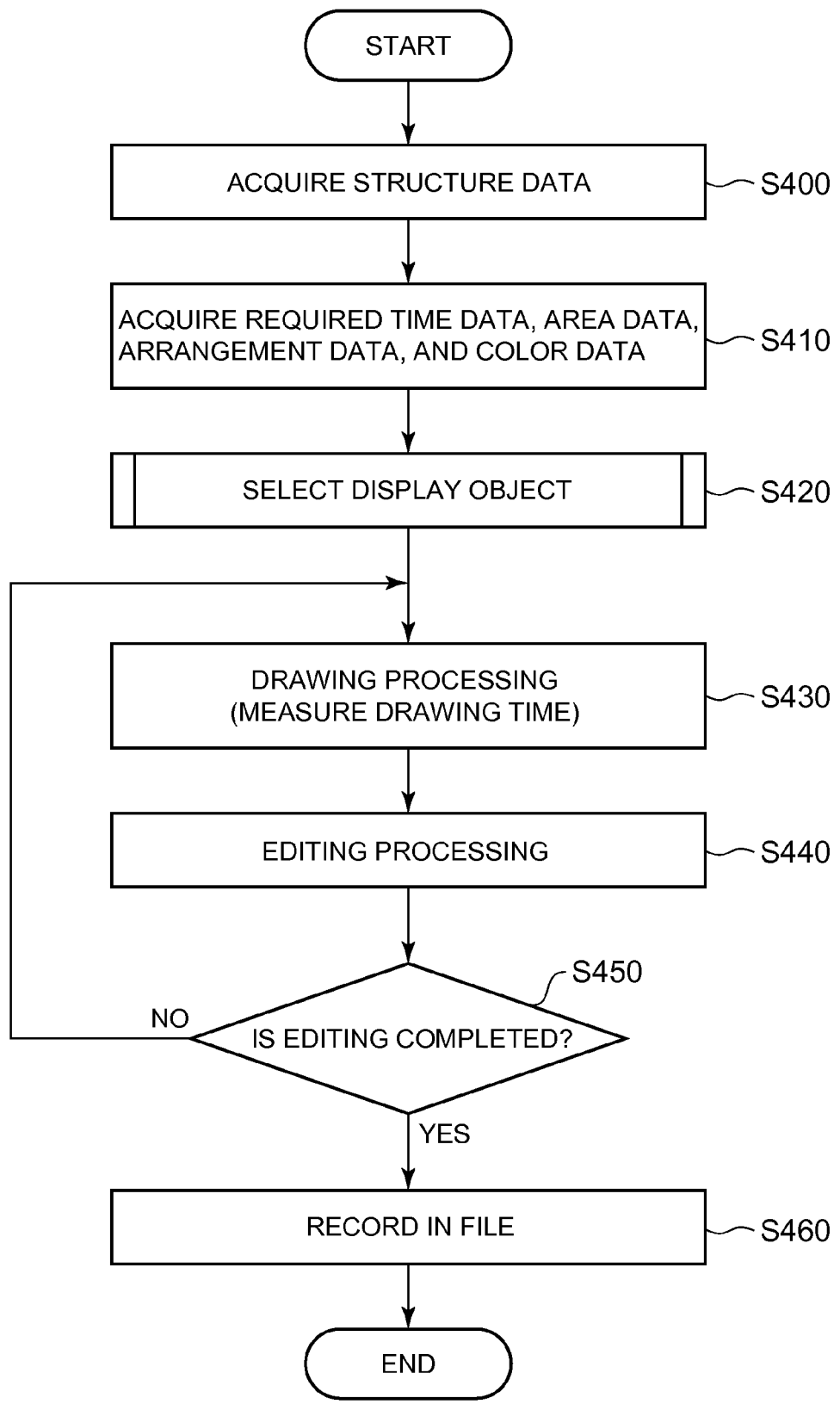
FIG. 4 shows a flow of processing for the information system 10 to display a web page on a screen or to edit the web page based on operation received for the displayed screen.

FIG. 4 shows a flow of processing for the information system 10 to display the web page on the screen or to edit the web page based on the operation received for the displayed screen. The structure acquisition unit 300 acquires the tree structure data described above from the layout file 22 as the structure data defining the structure of the document to be displayed on the screen (S400). The acquired structure data is stored in the storage unit 350. The time acquisition unit 310 acquires the required time indicating the time which has been previously required for drawing each of the plurality of display objects on the screen from the control file 25 (S410). In addition, the area acquisition unit 320 may acquire the area data from the control file 25, and the figure acquisition unit 330 may acquire the arrangement data and the color data from the control file 25. These pieces of data may be those generated based on each display object drawn when the drawing processing unit 360 has previously displayed the same web page or those generated when another unit of the information system 10 has displayed the web page.

The selection unit 340 selects, among the display objects at the leaf nodes of the structure data, display objects which should be displayed in the simplified form, based on the required time data and the area data (S420). The drawing processing unit 360 draws other display objects on the screen of the display unit 15, preferentially to the display objects selected by the selection unit 340 (S430). For example, the drawing processing unit 360 may display the selected display objects in the simplified form and display the other objects in the full form. Alternatively, the drawing processing unit 360 may not display the display objects selected by the selection unit 340 but display only the other objects. Furthermore, in this case, the drawing processing unit 360, after allowing an input of page editing to be accepted upon the other display objects being displayed, may sequentially display the above non-displayed display objects while processing the page editing. As is understood, preference of drawing may advance the timing of drawing, and non-preference of drawing may delay the timing of drawing. Moreover, during the course of this drawing processing, the time measurement unit 380 measures, for each of the display objects drawn by the drawing processing unit 360, the required time for drawing that display object on the screen Next, the editing processing unit 370 modifies the structure data stored in the storage unit 350 based on the operation received by the input unit 375 for the display object drawn by the drawing processing unit 360 (S440). Under the condition that the instruction to terminate the editing is inputted (S450: YES), the file recording unit 390 records various information in the layout file 22 and the control file 25 (S460). Specifically, the file recording unit 390 reads the structure data stored in the storage unit 350 and records it in the layout file 22. In addition, the file recording unit 390 records the information on the required time received from the time measurement unit 380 as the required time data in the control file 25. Moreover, the file recording unit 390 records the information indicating the area of each display object displayed on the screen, the information indicating the position or shape of each display object displayed on the screen, and the information indicating the color of each display object, in the control file 25, as the area data, the arrangement data, and the color data, respectively. Meanwhile, if the instruction to terminate the editing is not inputted (S450: NO), the information system 10 returns the processing to S430 to display the screen again based on the structure data after editing.

Figure 5:
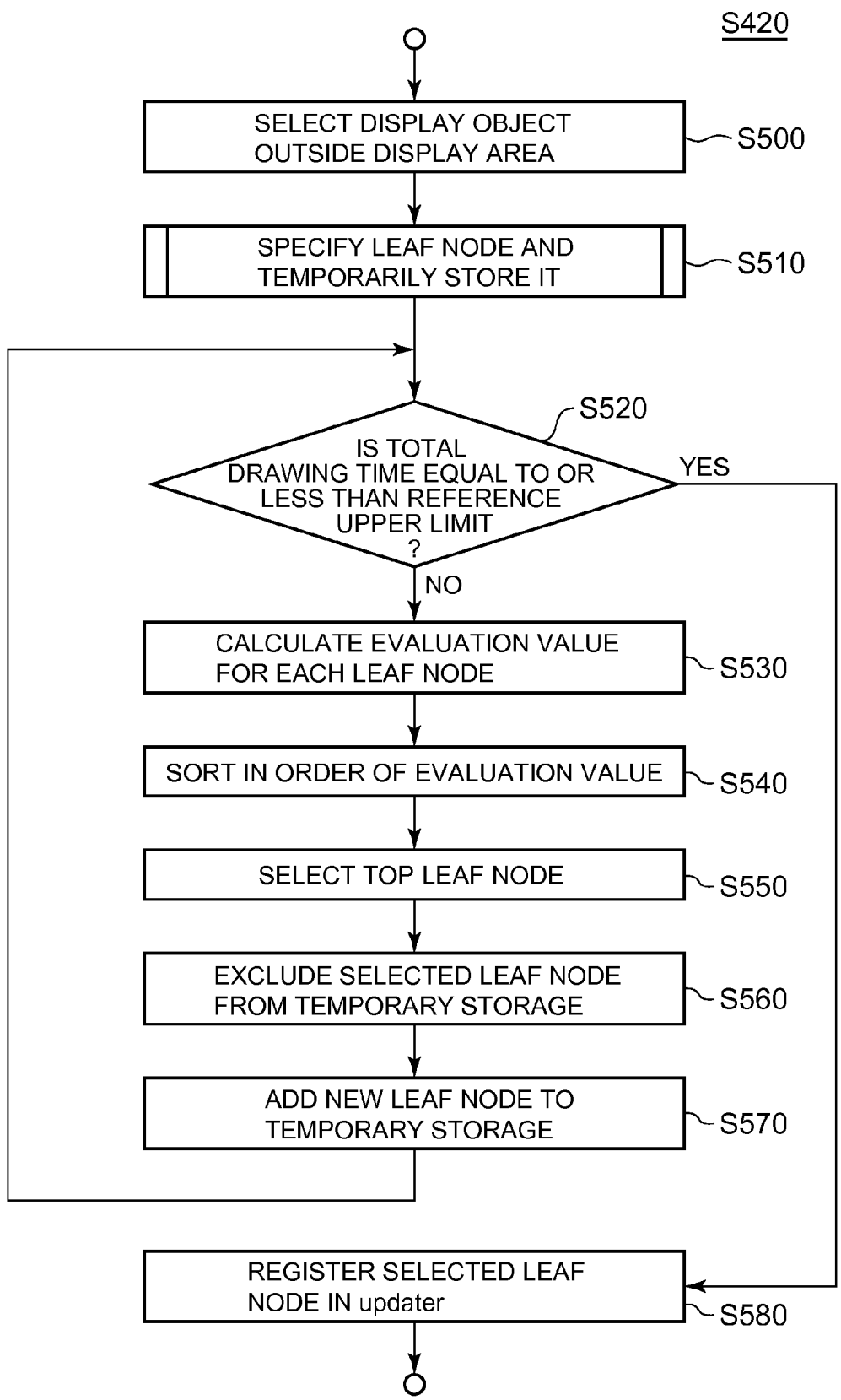
FIG. 5 shows the details of processing at S420 of FIG. 4.

FIG. 5 shows the details of the processing at S420 of FIG. 4. First, the selection unit 340 acquires the information on the size and shape of the display area where the web page is displayed on the display unit 15, and selects a display object outside the display area as the one which should be displayed in the simplified form (S500). This is because such a display object is not immediately recognizable for the user, and thus has less influence by delaying or omitting the display. Next, the determination unit 342 identifies or specifies a leaf node of the structure data having a tree structure, and stores identification information of each leaf node in a temporary storage region (S510). The determination unit 342 may specify, in addition to the leaf node, a node having only a leaf node with extremely small area as a child node and stores the identification information thereof. This will be described later in detail by reference to FIG. 6.

Next, the determination unit 342 totals the required time for drawing the display object which has not been selected yet by the selection unit 340 to determine whether or not the total value is equal to or less than the predetermined upper limit (S520). Under the condition that the total value exceeds the upper limit (S520: NO), the selection unit 340 repeats the processing of S530 through S570 until the total value becomes equal to or less than the upper limit. First, the selection processing unit 345 calculates, for each node stored in the temporary storage region at S510, the evaluation value indicating the degree for that node to be displayed in the simplified form (S530). This evaluation value is calculated by inputting the required time and the area corresponding to that node in the evaluation function. This evaluation function is a function which takes a large value depending on the length of the required time and a small value depending on the size of the area. As a result, a larger evaluation value is calculated for a display object having a longer required time and a smaller area.

Next, the selection processing unit 345 rearranges the nodes stored in the temporary storage region in the descending order of the evaluation value (S540). Next, the selection processing unit 345 selects a top node among the rearranged nodes (S550). Thereby, the display objects are sequentially selected in the order of position, closest to the leaf side of the hierarchical structure first, in the descending order of the required time, and in the ascending order of the area. Next, the selection processing unit 345 excludes the identification information on the selected node from the temporal storage region (S560). By this selection, a node having only this node as a child node becomes a new leaf node and thus a candidate of selection. Hence, the selection processing unit 345 additionally stores the identification information on a parent node having only the node selected this time as a child node in the temporary storage region among the structure data excluding the nodes which have been already selected (S570). The selection unit 340 then returns the processing to S520.

Meanwhile, if the total value of the required time is equal to or less than the upper limit (S520: YES), the selection unit 340 registers the selected node in an updater. The updater is a software module which draws the display object in parallel with the editing processing after the drawing processing is terminated and an operation right for editing is returned to the user. Thereby, even the display objects displayed in the simplified form can be sequentially displayed in the full form when the information system 10 has sufficient throughput during the later editing processing. Incidentally, even when the total value of the required time exceeds the upper limit, the selection unit 340 may terminate the selection processing of the display object if the number of the selected display objects to be displayed in the simplified form exceeds predetermined percentage of the number of the display objects of the whole web page. This can prevent so many display objects from being displayed in the simplified form.

Figure 6:
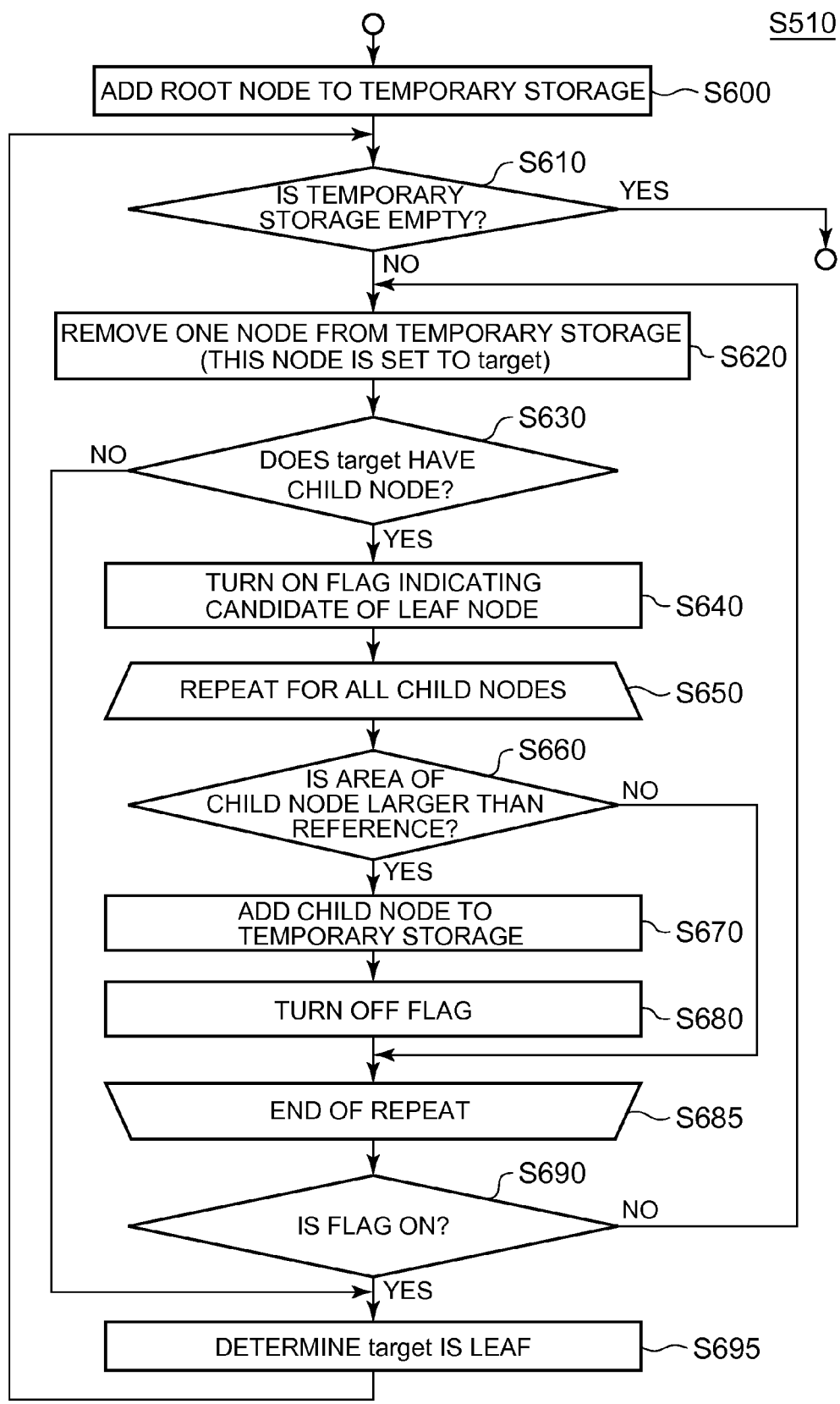
FIG. 6 shows the details of the processing at S510 of FIG. 5.

FIG. 6 shows the details of the processing at S510 of FIG. 5. With reference to FIG. 6, there will be described a specific example of the processing for specifying leaf nodes or nodes which should be regarded as leaf nodes. The node which should be regarded as the leaf node is a parent node having only a node with the extremely small area as a child node. By regarding such a node as a leaf node, it is possible to reduce the number of nodes for which it is determined whether or not they should be displayed in the simplified form to increase the efficiency of the processing. This processing will be specifically described below.

The selection processing unit 345 stores the identification information on the root node of the structure data in a temporary storage region (S600). This temporary storage region is different from the storage region described in FIG. 5. Next, the selection processing unit 345 determines whether or not this temporary storage region is empty (S610). The selection processing unit 345 terminates the processing in this figure if the temporary storage region is empty (S610: YES). If the temporary storage region is not empty (S610: NO), the selection processing unit 345 selects one node from the temporary storage region and excludes it (S620). This node is referred to as a target hereinafter.

The selection processing unit 345 determines whether or not the target has a child node (S630). If it does not have a child node (S630: NO), the selection processing unit 345 determines that the target is a leaf node or a node which should be regarded as a leaf node (S695), and returns the processing to S610. Under the condition that the target has a child node (S630: YES), the selection processing unit 345 turns a flag ON, which indicates that the target is a candidate of a node which should be regarded as a leaf node (S640).

The selection processing unit 345 then repeats the following processing for each of all the child nodes of the target (S650). First, the selection processing unit 345 determines whether or not the area of the current child node is equal to or larger than a predetermined reference area (S660). Under the condition that the area is equal to or larger than the reference area (S660: YES), the selection processing unit 345 additionally stores that child node in the temporary storage region (S670). Next, the selection processing unit 345 turns the flag, which indicates that the target is a candidate of a node which should be regarded as a leaf node, OFF (S680). Meanwhile, if the area of the child node is less than the reference area (S660:

NO), the selection processing unit 345 does not perform any processing and proceeds to the processing for the next child node. The selection processing unit 345 repeats the above processing for each child node (S685).

Next, the selection processing unit 345 determines whether or not the flag described above is ON (S690). If it is OFF (S690: NO), the selection processing unit 345 returns the processing to S620. If it is ON (S690: YES), the selection processing unit 345 determines that the target is a leaf node or a node which should be regarded as a leaf node (S695), and returns the processing to S610. As described above, according to the processing described by reference to FIG. 6, if any child node has a smaller area than the reference area and is a leaf node, the selection unit 340 regards a parent node thereof as a leaf node and can select a display object which should be displayed in the simplified form.

Figure 7:
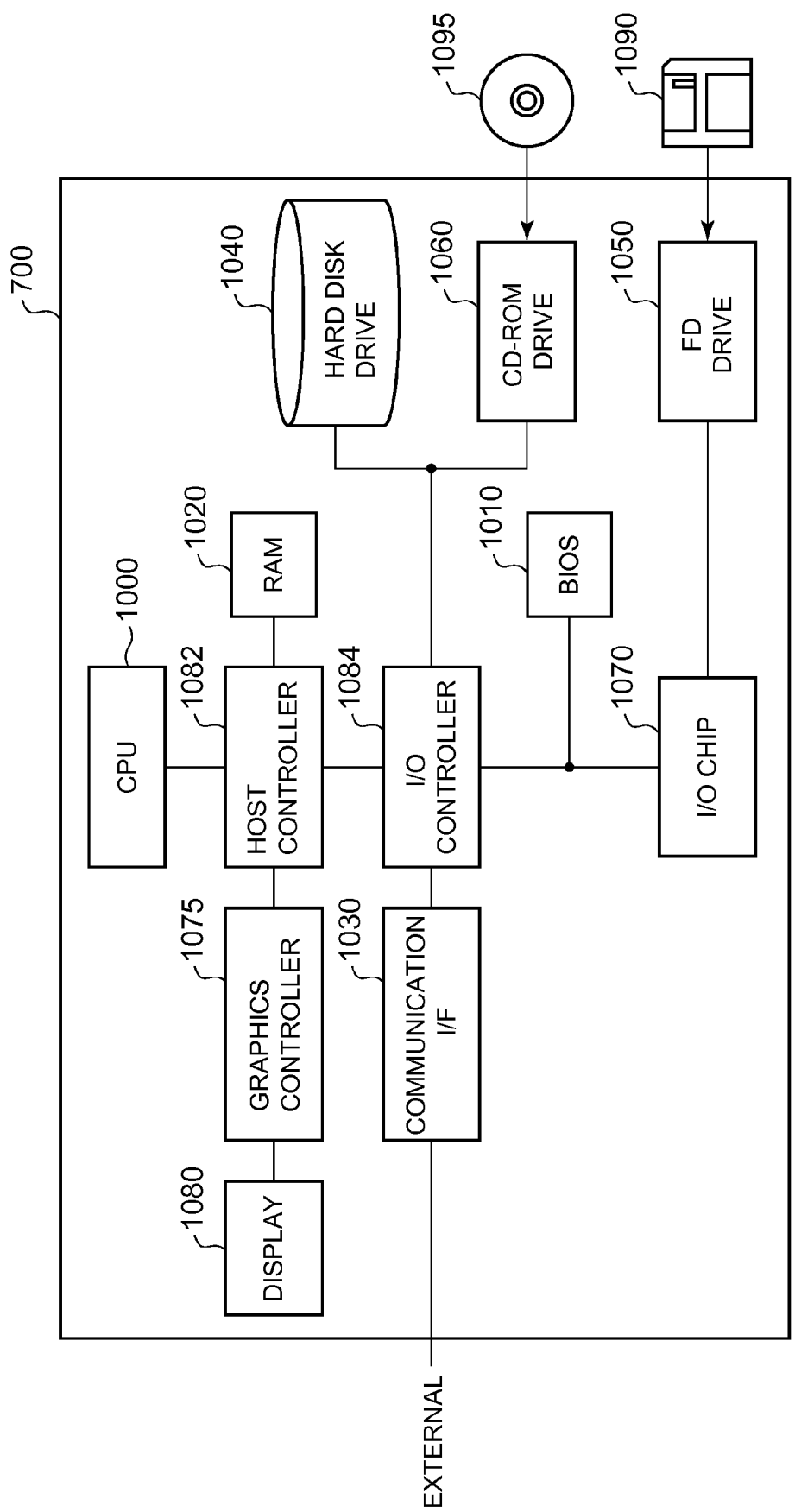
FIG. 7 shows an example of a hardware configuration of an information processor 700 functioning as the information system 10.

FIG. 7 shows an example of a hardware configuration of an information processor 700 functioning as the information system 10. The information processor 700 is provided with a CPU-related part having a CPU 1000, a RAM 1020, and a graphics controller 1075, which are connected with each other via a host controller 1082, an I/O part having a communication interface 1030, a hard disk drive 1040, and a CD-ROM drive 1060, which are connected to the host controller 1082 via an I/O controller 1084, and a legacy I/O part having a ROM 1010, a flexible disk drive 1050, and an I/O chip 1070, which are connected to the I/O controller 1084.

The host controller 1082 connects the RAM 1020 with the CPU 1000 and the graphics controller 1075, which access the RAM 1020 at a high transfer rate. The CPU 1000 operates based on programs stored in the ROM 1010 and the RAM 1020, and controls each part. The graphics controller 1075 acquires image data, created by the CPU 1000 or the like on a frame buffer provided in the RAM 1020, and displays it on a display 1080. Instead, the graphics controller 1075 may contain the frame buffer therein for storing the image data created by the CPU 1000 or the like.

The I/O controller 1084 connects the host controller 1082 with the communication interface 1030, the hard disk drive 1040, and the CD-ROM drive 1060, which are relatively high-speed I/O devices. The communication interface 1030 communicates with an external device via a network. The hard disk drive 1040 stores programs and data used by the information processor 700. The CD-ROM drive 1060 reads a program or data from the CD-ROM 1095, and provides it to the RAM 1020 or the hard disk drive 1040.

In addition, the I/O controller 1084 is connected with the ROM 1010, as well as the flexible disk drive 1050 and the I/O chip 1070, which are relatively low-speed I/O devices. The ROM 1010 stores a boot program executed by the CPU 1000 at the time of starting of the information processor 700, and programs which depend on the hardware of the information processor 700. The flexible disk drive 1050 reads a program or data from the flexible disk 1090, and provides it to the RAM 1020 or the hard disk drive 1040 via the I/O chip 1070. The I/O chip 1070 connects the flexible disk 1090 and various kinds of I/O devices via, for example a parallel port, a serial port, a keyboard port, a mouse port, or the like.

The program of the present invention provided to the information-processing apparatus 700 is stored in a recording medium, such as the flexible disk 1090, the CD-ROM 1095, or an IC card, and is provided by the user. The program is read from the recording medium via the I/O chip 1070 and/or the I/O controller 1084, installed in the information processing apparatus 700 and executed. Since the operation which the program causes the information processor 700 or the like to perform is the same as the operation on the information system 10 described in FIGS. 1 to 6, the description thereof is omitted.

The program described above may be stored in an external storage medium. The storage medium may include, other than the flexible disk 1090 or the CD-ROM 1095, an optical recording medium, such as a DVD or a PD, a magneto-optical recording medium, such as an MD, a tape medium, or a semiconductor memory, such as an IC card. Moreover, a storage device such as a hard disk drive, a RAM, or the like, provided in a server system connected to a private telecommunication network or the Internet may be used as the recording medium to provide the program to the information processor 700 via the network.

As described above, according to the information system 10 of this embodiment, if the web page has a large number of display objects and the drawing takes time, it is possible to appropriately select display objects therefrom, which are less likely to change the appearance of the whole web page even when they are displayed in the simplified form. In order to reduce the drawing time, the display objects which should be displayed in the simplified form are selected in the descending order of the previous drawing time. In addition, the display objects which should be displayed in the simplified form are selected in the ascending order of the previous drawing area, so that the simplified display does not become noticeable. For the same reason, the display objects which should be displayed in the simplified form are selected in the order of position, starting from the one closest to the leaf side of the hierarchical structure first. Thereby, it is possible to discretely arrange the display objects displayed in the simplified form by distributing them over the web page. By applying such high-speed drawing processing to the web authoring tool, it is possible to promptly and fully display the object having high priority while promptly completing the drawing processing and returning the operation right to the user, allowing operability being increased to increase the efficiency of the page editing.

While the present invention has been described using the embodiments, the technical scope of the present invention is not limited to the scope described in the aforementioned embodiments. It is obvious to those skilled in the art that various modifications or improvements may be added to the aforementioned embodiments. It is clear from the description of claims that such modified or improved embodiments can also be included in the technical scope of the present invention.

What is claimed is:

1. A computer-implemented system for controlling a screen display, comprising:
   at least one processor with memory, the processor supporting the execution of:
   a structure acquisition unit configured to acquire tree structure data, as structure data defining a structure of a document to be displayed on a screen, in which a plurality of display objects are represented as nodes and a display object indicating a more detailed configuration of a display object at a parent node is represented as a child node;
   a time acquisition unit configured to acquire required time data which indicates time that has been previously required to draw each of the plurality of display objects on the screen;
   a selection unit configured to select, among the display objects at leaf nodes of the structure data, a display object having an evaluation value obtained based on the required time data which indicates that the required time is longer, preferentially to a display object having an evaluation value which indicates that the required time is shorter; and a drawing control unit configured to draw a display object other than the selected display object preferentially to the selected display object on the screen.

2. The system according to claim 1, further comprising a time measurement unit configured to measure, for each of the display objects drawn by the drawing control unit, the required time for drawing that display object on the screen, wherein the time acquisition unit acquires the required time data which indicates the required time measured by the time measurement unit regarding the already drawn display object, as the required time data which indicates the required time in the case where the same display object as the drawn display object is displayed next.

3. The system according to claim 1, further comprising an area acquisition unit configured to acquire an area of each of the display objects being drawn on the screen by the drawing control unit, as area data which indicates the area of each of the display objects being next drawn on the screen, wherein the selection unit calculates the evaluation value further based on the area data, and selects a display object having an evaluation value which indicates that the area is smaller, preferentially to a display object having an evaluation value which indicates that the area is larger.

4. The system according to claim 3, wherein the selection unit selects a display object in the structure data by regarding a parent node as a leaf node, the parent node having child nodes any of which has a smaller area than a predetermined reference area and is a leaf node.

5. The system according to claim 3, wherein the selection unit calculates, for each of the display objects at leaf nodes, the evaluation value by inputting the required time and the area corresponding to that display object into an evaluation function which takes a large value depending on the length of the required time and a small value depending on the size of the area, and preferentially selects a display object having the larger calculated evaluation value.

6. The system according to claim 1, wherein the selection unit selects, based on the required time data, display objects at leaf nodes in the descending order of the required time until a total required time for drawing unselected display objects in the structure data becomes equal to or below a predetermined upper limit.

7. The system according to claim 6, wherein the selection unit comprises:

a determination unit configured to determine whether or not the total required time for drawing is equal to or less than the upper limit for the display objects excluding the display objects already selected from the structure data; and a selection processing unit configured to select a display object having the longest required time from the leaf nodes in the tree structure excluding the display objects already selected from the structure data under the condition that the total required time for drawing exceeds the upper limit;

wherein the determination unit further determines whether or not the total required time for drawing is equal to or less than the upper limit for the structure data excluding the display object selected by the selection processing unit.

8. The system according to claim 1, wherein the drawing control unit displays the display object selected by the selection unit while omitting a part of pixels which should be displayed, and displays the display object not selected by the selection unit while not omitting pixels which should be displayed.

9. The system according to claim 8, further comprising a figure acquisition unit configured to acquire arrangement data indicating a position and a shape on the screen of the display object previously drawn, and color data indicating background color and foreground color of the display object for each of the plurality of display objects, wherein the drawing control unit draws a figure having the shape based on the arrangement data while coloring a borderline of the figure with the foreground color and inside of the figure with the background color at the position based on the arrangement data of the display object, instead of the display object selected by the selection unit.

10. The system according to claim 1, wherein the system is an editing system for editing configuration of the screen, wherein the structure acquisition unit acquires the structure data from a layout file which records the structure data, and the time acquisition unit acquires the required time data from a control file which is provided separately from the layout file, the system further comprising:

an editing processing unit configured to modify the structure data based on operation received for the display object drawn by the drawing control unit; and a file recording unit configured to record the modified structure data in the layout file and recording the required time for drawing processing of each of the display objects by the drawing control unit in the control file, in accordance with an instruction to record the structure data in the file.

11. A computer-implemented system for controlling a screen display, comprising:

at least one processor with memory, the processor supporting the execution of:

a structure acquisition unit configured to acquire tree structure data, as structure data defining a structure of a document to be displayed on a screen, in which a plurality of display objects are represented as nodes and a display object indicating a more detailed configuration of a display object at a parent node is represented as a child node;

a time acquisition unit configured to acquire required time data which indicates time that has been previously required to draw each of the plurality of display objects on the screen;

an area acquisition unit configured to acquire area data which indicates an area of each display object when each of the plurality of display objects has been previously drawn on the screen;

a selection unit configured to select, among the display objects at leaf nodes of the structure data, a display object having an evaluation value obtained based on the required time data which indicates that the required time is longer and the area data which indicates that the area is smaller, preferentially to a display object having an evaluation value which indicates that the required time is shorter and the area is larger; and a drawing control unit configured to draw a display object other than the selected display object preferentially to the selected display object on the screen.

12. A method of controlling a screen display, comprising the steps of:

acquiring tree structure data, as structure data defining a structure of a document to be displayed on a screen, in which a plurality of display objects are represented as nodes and a display object indicating a more detailed configuration of a display object at a parent node is represented as a child node;

acquiring required time data which indicates time that has been previously required to draw each of the plurality of display objects on the screen;

selecting, among the display objects at leaf nodes of the structure data, a display object having an evaluation value obtained based on the required time data which indicates that the required time is longer, preferentially to a display object having an evaluation value which indicates that the required time is shorter; and drawing a display object other than the selected display object preferentially to the selected display object on the screen.

13. A program stored on a non-transitory computer usable storage medium having computer usable program code for causing an information processor to function as a system for controlling a screen display, the program causing the information processor to function as:

a structure acquisition unit configured to acquire tree structure data, as structure data defining a structure of a document to be displayed on a screen, in which a plurality of display objects are represented as nodes and a display object indicating a more detailed configuration of a display object at a parent node is represented as a child node;

a time acquisition unit configured to acquire required time data which indicates time that has been previously required to draw each of the plurality of display objects on the screen;

a selection unit configured to select, among the display objects at leaf nodes of the structure data, a display object having an evaluation value obtained based on the required time data which indicates that the required time is longer, preferentially to a display object having an evaluation value which indicates that the required time is shorter; and a drawing control unit configured to draw a display object other than the selected display object preferentially to the selected display object on the screen.

14. A method of controlling a screen display, comprising the steps of:

acquiring tree structure data, as structure data defining a structure of a document to be displayed on a screen, in which a plurality of display objects are represented as nodes and a display object indicating a more detailed configuration of a display object at a parent node is represented as a child node;

acquiring required time data which indicates time that has been previously required to draw each of the plurality of display objects on the screen;

acquiring area data which indicates an area of each display object when each of the plurality of display objects has been previously drawn on the screen;

selecting, among the display objects at leaf nodes of the structure data, a display object having an evaluation value obtained based on the required time data which indicates that the required time is longer and the area data which indicates that the area is smaller, preferentially to a display object having an evaluation value which indicates that the required time is shorter and the area is larger; and drawing a display object other than the selected display object preferentially to the selected display object on the screen.

15. A program stored on a non-transitory computer usable storage medium having computer usable program code for causing an information processor to function as a system for controlling a screen display, the program causing the information processor to function as:

a structure acquisition unit configured to acquire tree structure data, as structure data defining a structure of a document to be displayed on a screen, in which a plurality of display objects are represented as nodes and a display object indicating a more detailed configuration of a display object at a parent node is represented as a child node;

a time acquisition unit configured to acquire required time data which indicates time that has been previously required to draw each of the plurality of display objects on the screen;

an area acquisition unit configured to acquire area data which indicates an area of each display object when each of the plurality of display objects has been previously drawn on the screen;

a selection unit configured to select, among the display objects at leaf nodes of the structure data, a display object having an evaluation value obtained based on the required time data which indicates that the required time is longer and the area data which indicates that the area is smaller, preferentially to a display object having an evaluation value which indicates that the required time is shorter and the area is larger; and a drawing control unit configured to drawing a display object other than the selected display object preferentially to the selected display object on the screen.

* * * * *